May 21, 1935.  J. OLSEN  2,001,849

REGENERATIVE PASTEURIZATION APPARATUS

Filed Feb. 3, 1932  6 Sheets-Sheet 1

Inventor:
Johannes Olsen

May 21, 1935.  J. OLSEN  2,001,849
REGENERATIVE PASTEURIZATION APPARATUS
Filed Feb. 3, 1932  6 Sheets—Sheet 3

Inventor:
Johannes Olsen
By
Attorney.

May 21, 1935.  J. OLSEN  2,001,849
REGENERATIVE PASTEURIZATION APPARATUS
Filed Feb. 3, 1932   6 Sheets-Sheet 4

Inventor:
Johannes Olsen
By
Attorney

May 21, 1935.    J. OLSEN    2,001,849
REGENERATIVE PASTEURIZATION APPARATUS
Filed Feb. 3, 1932    6 Sheets-Sheet 5

Inventor:
Johannes Olsen

Patented May 21, 1935

2,001,849

UNITED STATES PATENT OFFICE 2,001,849

REGENERATIVE PASTEURIZATION APPARATUS

Johannes Olsen, Aalborg, Denmark, assignor to Buaas Mejerimaskinfabrikker, Afdeling Af Aktieselskabet Frederiksberg Metalvarefabrik, Aalborg, Denmark, a corporation of Denmark Application February 3, 1932, Serial No. 590,728
In Denmark April 20, 1931

14 Claims. (Cl. 257—245)

The present invention relates to a regenerative pasteurizing apparatus.

An object of this invention is to devise a regenerative pasteurizing apparatus consisting of heat exchange units formed of a plurality of detachably assembled cone-shaped casings.

In accordance with the present invention a liquid to be pasteurized is heated to a pasteurizing temperature and is then cooled first by giving up heat to liquid to be pasteurized and finally by being cooled by a cooling medium. In this way the liquid to be pasteurized is preheated by waste heat, resulting in heat economy. An apparatus for carrying out the present invention comprises heat exchange units formed of a plurality of assembled nested cone-shaped casings. The conical casings are provided with annular spacing flanges at the apex and at the base of the cones. Means are provided in the flanges for providing communication between compartments provided between the nested conical casings. The conical casings are assembled on a stationary frame provided with ports to communicate with those in the flanges of the casings by means of which fluids may be led to and away from the compartments formed between the conical casings. Some of the casings can be placed on the one side and the rest on the other side of the vertical center plan of the apparatus. All the casings can be screwed tight partly against the frame of the apparatus and partly against each other by a single screwing-up device which has been built into the apparatus.

In the drawings:

Figs. 10 and 11 are drawn on a smaller scale than the other figures.

In the form of construction shown in Figs. 1-6, the apparatus consists of a frame, the lower part of which is shaped as a foot 1, while the upper part consists of a circular rim or header 2, against which the casings of the apparatus are screwed. On this frame are further placed bearings 3 and 4, the center line of which corresponds with the center line of the rim or header 2. In these bearings are rotatably mounted two tubes 6 and 7 rotatably placed around the boss of a worm-wheel 5, which tubes are screw-cut on the inside so that they form nuts for a screw-cut part of two sliding and rotatably placed spindles 8 and 9, respectively. One of the spindles has right-handed, the other left-handed, thread, so that rotation of the worm-wheel 5 in one direction will make the two spindles approach each other, while rotation of the worm-wheel in the other direction will make them diverge.

On either side of the rim 2 are fixed two supporting casings 10 and 11, respectively, of rather great thickness. These casings can be made of pig iron, whereas the other casings are made of copper or other suitable material.

In the form of construction shown, a number of casings are assembled so that on one side are formed the inter-spaces 12, 13, 14, 15, 18, 19, 20 and 21, and on the other side the inter-spaces 16, 17, 22 and 23. The liquid, generally milk, which is to be pasteurized, is led in through an inlet 24 (Fig. 2) on the rim 2 and conducted through ports in the outer annular flanges 85 of the casings into the space 12. When it has run through this space, it is conducted through ports in the inner flange into the space 13, and thence through ports in flanges 85 to space 14, and then finally through ports in the inner flanges to the space 15. By passing through these spaces, the liquid is heated by the pasteurized milk. From the space 15, it is conducted through still other ports in the flanges 85 and a passage 25 of the rim 2 to the space 18 in the opposite compartment. From the space 18, it is conducted through ports in the inner flanges into the space 17, and after having run through this space, it is conducted through ports in the flanges 85 and a passage 26 of the rim 2 back to the first compartment, where it is led into the space 18 and thence gradually and alternately through ports in the inner and outer flanges to the spaces 19, 20 and 21, by which it gives heat to the colder milk running in the spaces 12, 13, 14 and 15, so that the pasteurized milk is considerably refrigerated before it leaves the space 21 and is led away from the apparatus through an outlet 27 in the rim 2.

For the purpose of heating the milk in the compartment formed between the casings in which the pasteurization takes place steam or hot water can be led in through an inlet 28 of the rim 2, which steam is led through ports 86 in flanges 85 and duct 87 into the space 22, and after having run through space 22 it passes to the space 23, from where the condensed steam is led away through a bottom outlet 23' of the rim 2. In both ends the casings are provided with heavy collars or flanges 85, so that they can be pressed hard against the internal supporting casings 10, 11 and against each other to obtain tightness, a usual packing member being placed between the collars. The space between spaces 14 and 19 may serve as an insulating air space.

Outside the outermost casing in each compartment are placed supporting casings 33 and 34 of a suitable material.

The spindles 8 and 9 pass out through all the casings, and on the outside of the casings the spindles are provided with grooves 48 with which projections 51 (Fig. 3) of a keeper 35 engage when the keeper, which is fork-shaped, is pushed down over the spindles.

Around the tubes 6 and 7 are placed sliding toothed couplings 36 and 37, respectively, which are adapted to rotate with tubes 6 and 7. Keys 90 cause couplings 36 and 37 to rotate with tubes 6 and 7. Handles 38 are fixed each on the shafts 40 and 41 mounted rotatably in bearings of the frame, on which shafts are fixed arms 39 which can push the couplings forward and back in the usual manner. When one of the couplings is thrown into gear with the worm-wheel 5, the lugs 88 carried by the coupling enter into the socket 89. A hand wheel 42 is fixed on a shaft 43 rotatably mounted in the frame. On this shaft is placed a toothed wheel 44, which is shown in gear with a toothed wheel 45 of a shaft 46, on which is placed a worm 47 which is in gear with the worm-wheel 5. When the worm-wheel 5 is turned in one direction, one of the tubes 6 or 7, which is coupled to the worm-wheel, will be rotated, so that the keeper 35 is pressed tightly against the casing 33 or 34, whereby the collars or flanges 85 of the outer rims of the casings are pressed close together. Likewise and simultaneously, the collars on the pointed ends of the casings are also pressed tightly. To make it possible to effect the tightening up with different rates of speed, another toothed wheel 49 is fixed on the shaft 43 which, as the shaft 43 is slidable, can be brought into gear with a toothed wheel 50 of the shaft 46.

To make sure that the openings or ports in the collars or flanges of the various casings cooperate with the proper inlets and outlets of the other collars or the rim 2, the collars are provided with guide spindles or similar means. Thus, more casings can be added on either side, and the tightening up of all the casings will take place from the center only and not, as hitherto, on the outer circumference of the collars. Furthermore, the tightening-up devices are perfectly covered inside the apparatus, so that they will not be dirtied by waste milk or effect any fouling of the milk.

Figure 1:
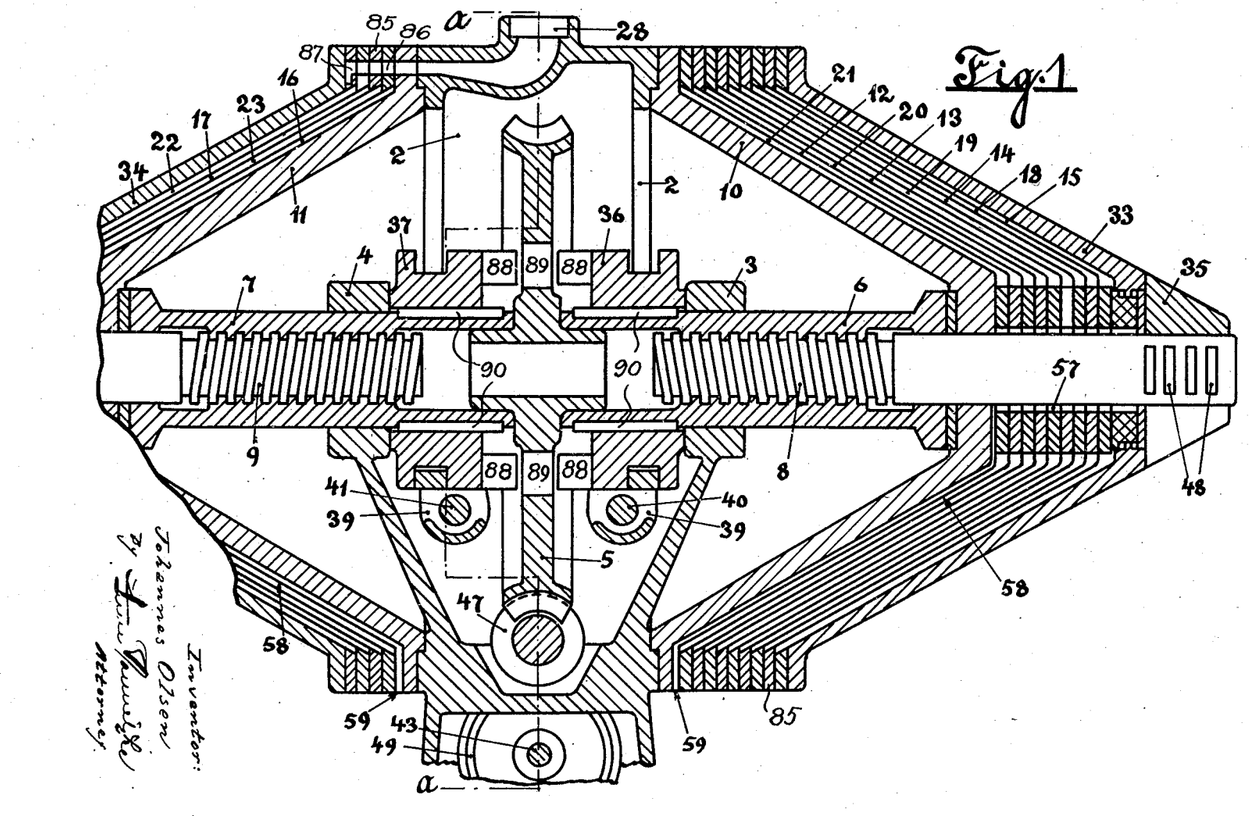
Figure 1 is a vertical longitudinal section on the line b—b in Fig. 2 and illustrates one form of construction of the invention.
Figure 2:
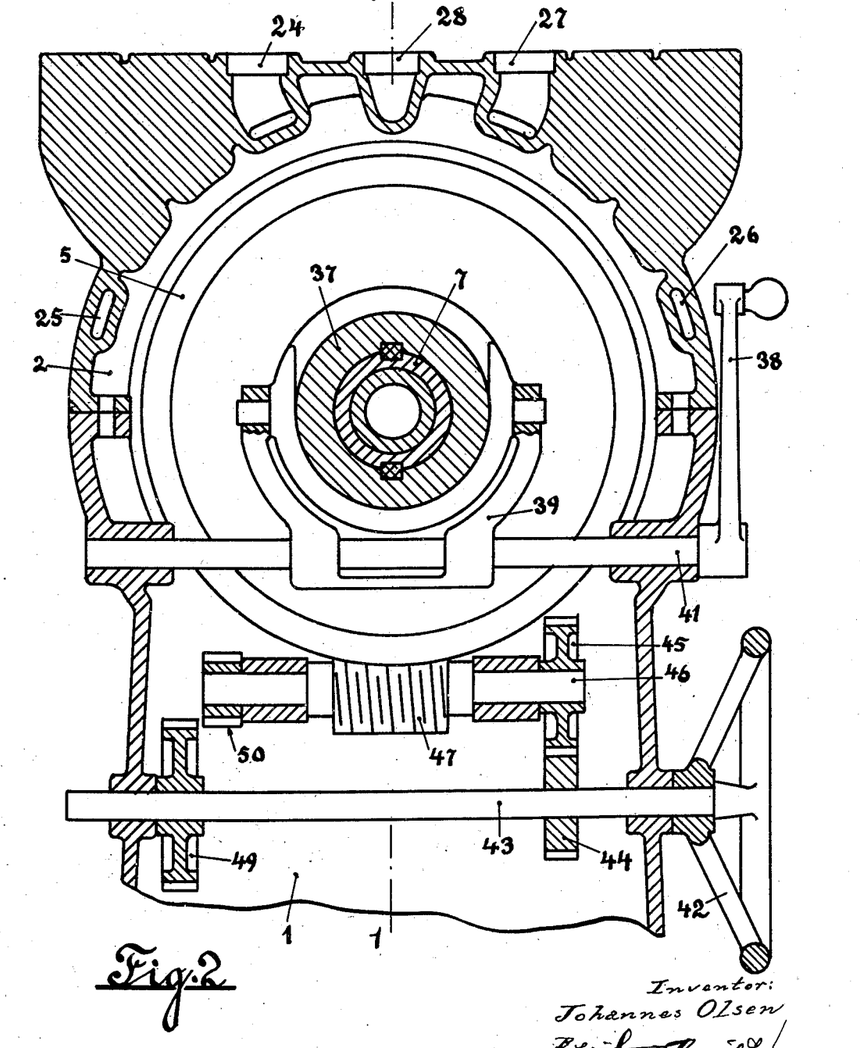
Fig. 2 is a section on the line a—a in Fig. 1.
Figures 3, 5:
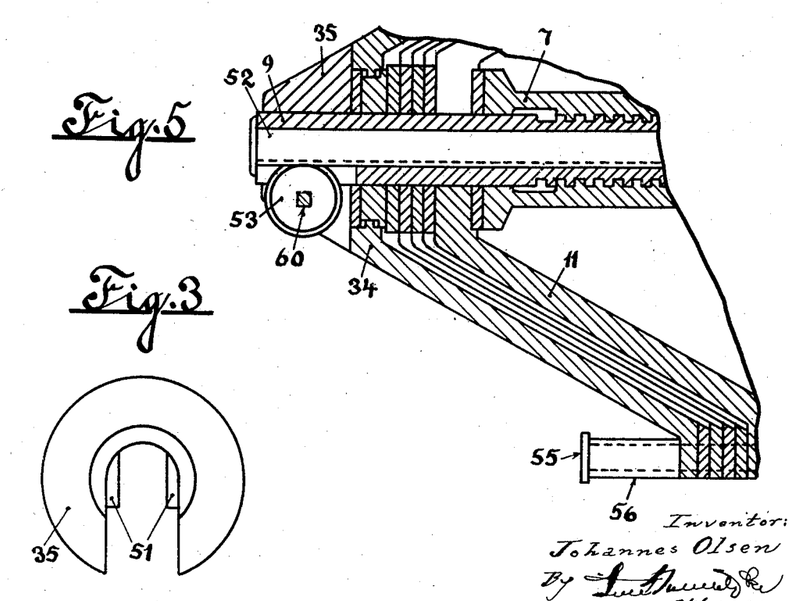
Fig. 3 is a detail view of a keeper for the casings.
Fig. 5 is a section on the line c—c in Fig. 4.
Figure 4:
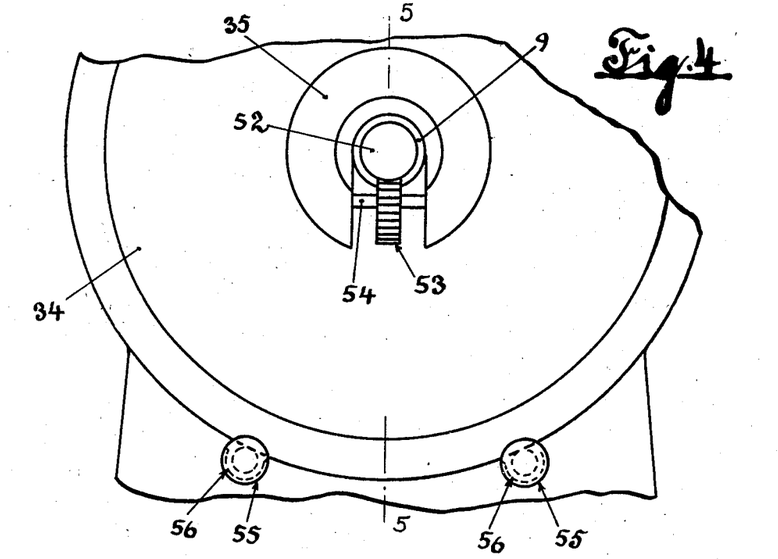
Fig. 4 shows part of another form of construction of the same apparatus in end view.
Figure 6:
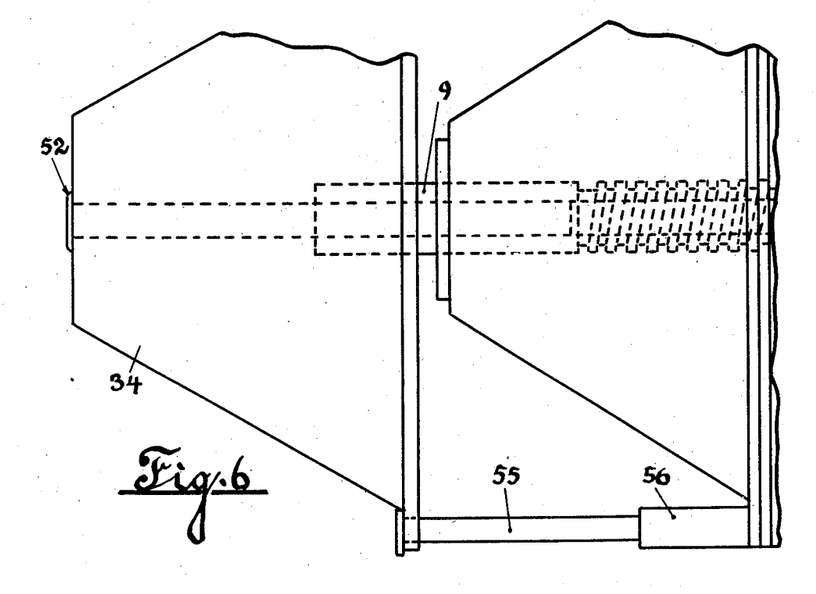
Fig. 6 shows the same in side view, when the apparatus has been partly taken apart.

Figs. 4–6 show a form of construction of the invention, according to which the casings need not be raised during the cleaning. This form of construction also prevents the casings being changed.

The spindles 8 and 9 are made hollow, so that a rod 52 can be moved therein. This rod can be provided with teeth on the bottom side, so that a toothed wheel 53 can be brought into mesh therewith. The toothed wheel 53 is placed on the shaft 54, which is rotatably mounted in the keeper 35. The shaft 54 is provided, at the position where the toothed wheel is to be placed, with a square piece 60 to enable it to carry the toothed wheel. This wheel should not be wedged up to the shaft, as it must be possible to remove the shaft and the toothed wheel when the rod 52 is moved out, in order to raise the keeper 35 to remove it. On rod 52 the casings can be pulled out and cleaned. In order to render a better support for the casings, one or more rods 55 can also be placed under the collars 85 of the casings, which rods are mounted for sliding in bearings 56 arranged for the purpose on the base 1. In Fig. 6, one of the casings is shown moved out into the position described for the purpose of cleaning.

For the purpose of leading liquid away from possible leaks between the collars or flanges at the pointed ends or apices of the casings, a passage 57 (Fig. 1) or suitable play is formed around the spindles 8 or 9. The liquid accumulated therein is led away through a passage 58 along the casings 10 and 11, the passage 58 being in communication with a passage 59 on the outer flanges of the casings 10 and 11.

The form of construction of the apparatus herein described consists of a series of casings of equal sizes, which can be interchanged and to which more casings can be added or some removed, so that the side of the apparatus can be altered according to the quantity of liquid to be worked.

To enable a change of the casings ad libitum, or an addition of more casings, all of the casings must have the same vertex angle and also the same diameter in cross-section, taken at a given distance from the summits of the frusto-conical portion thereof. However, the outside and the inside diameter in the said sections need not be simultaneously equal in size in all the sections. It is sufficient that either all the inside or all the outside diameters are equal, and the thickness of metal of the casings may be different within a certain limit. The only condition that must be complied with is that the thickness of the casing plus the adjoining space between this and the next casing together shall be equal to the thickness of the casing plus the inter-space of any other casing.

Figures 7, 9:
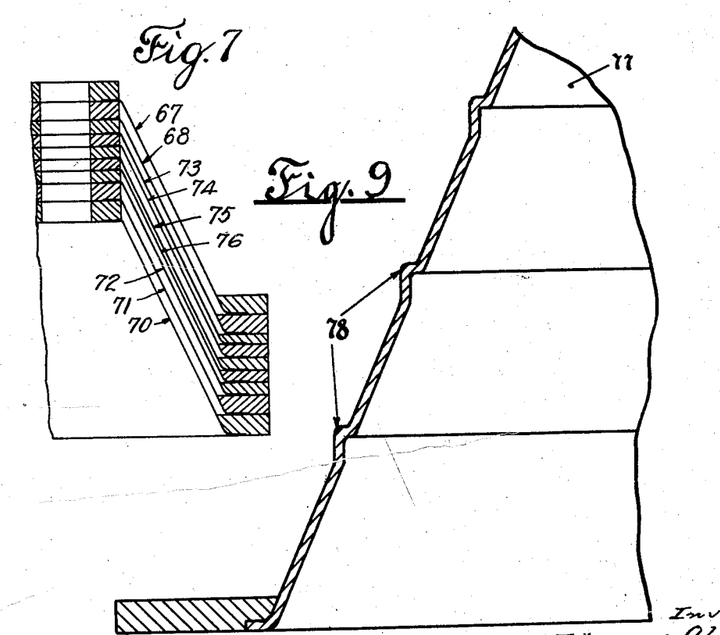
Fig. 7 shows part of a longitudinal section of a fourth form of construction of the apparatus.
Fig. 9 shows part of a vertical section of a casing as shown in Fig. 8 and drawn on a larger scale than Fig. 8.

In the form of construction shown in Fig. 7, the apparatus consists of an outer compartment of single casings 67 and 68 and an inner compartment also consisting of single casings 70, 71 and 72, and between these a compartment consisting of the casings 73, 74, 75 and 76. This latter compartment is divided into two groups, the casings 73 and 74 forming one group, the casings 75 and 76 forming another group. In this compartment, where the liquid is to be pasteurized, a smaller inter-space is needed for the liquid to run through during the pasteurization than in the compartments where the heating, regeneration and refrigeration of the liquid take place.

Instead of compounding the groups of two casings, as shown in the drawings, these may be compounded of more casings. Thus, instead of using a single system of equal casings, one or more systems of casings may be used, the casings of each system being of equal sizes.

In such an apparatus the single casings or the single groups of casings can be interchanged, so that it is quite immaterial where a single casing or a group consisting of two or more casings is placed. The placing of these is dependent on the way in which the liquid is to run through the apparatus.

In this form of construction it is required, in order to make it possible to add, remove or change the single groups of casings, that the thickness of one group plus its adjoining inter-space is of the same size as that of any other group of the same compartment plus its adjoining inter-space.

Figure 8:
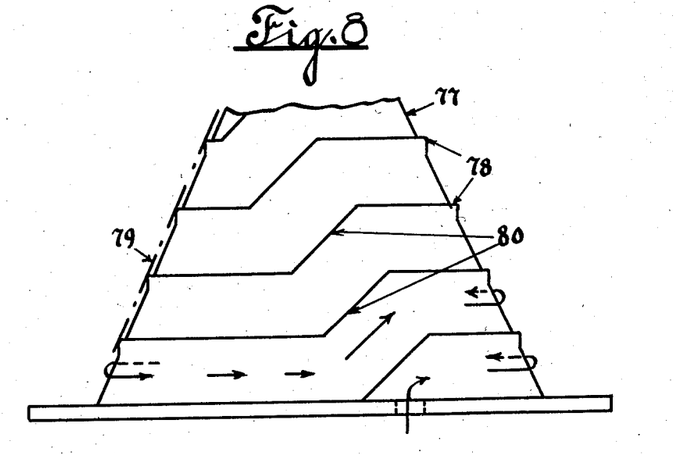
Fig. 8 shows part of a special form of construction of a casing.

Figs. 8 and 9 show a form of construction for a casing 77, the surface of which is provided with rings 78 which are concentric and project from the proper casing so that another casing 79 (shown in the drawings by a dotted line), when placed around the first casing, fits tight to these rings, whereby closed ring-shaped passages are formed in which the pasteurization liquid circulates, as shown by a series of arrows. When the liquid has run through one space, it flows up through an oblique passage to another ring-shaped chamber above the first chamber. These oblique passages are formed by projections 80 which are in connection with the rings. In this manner the liquid will gradually run through all the ring-shaped spaces and thereby contact with the whole surface of the casing.

The device described is applicable whether the casings are placed vertical or horizontal.

Figure 10:
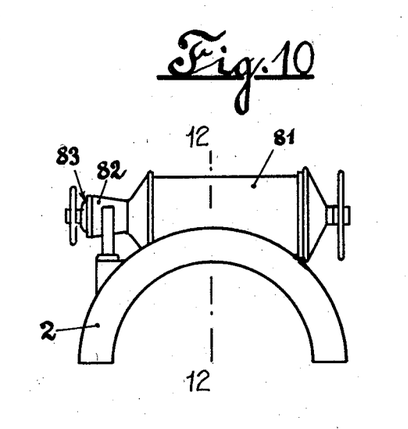
Fig. 10 is a view of a reservoir associated with the pasteurizing apparatus.
Figure 11:
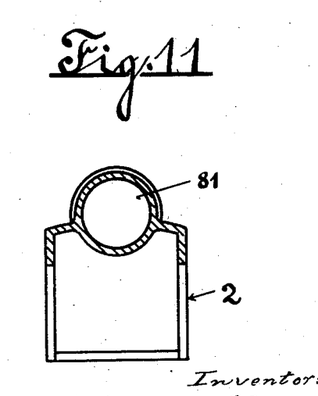
Fig. 11 is a section on the line d—d in Fig. 10.
Figure 12:
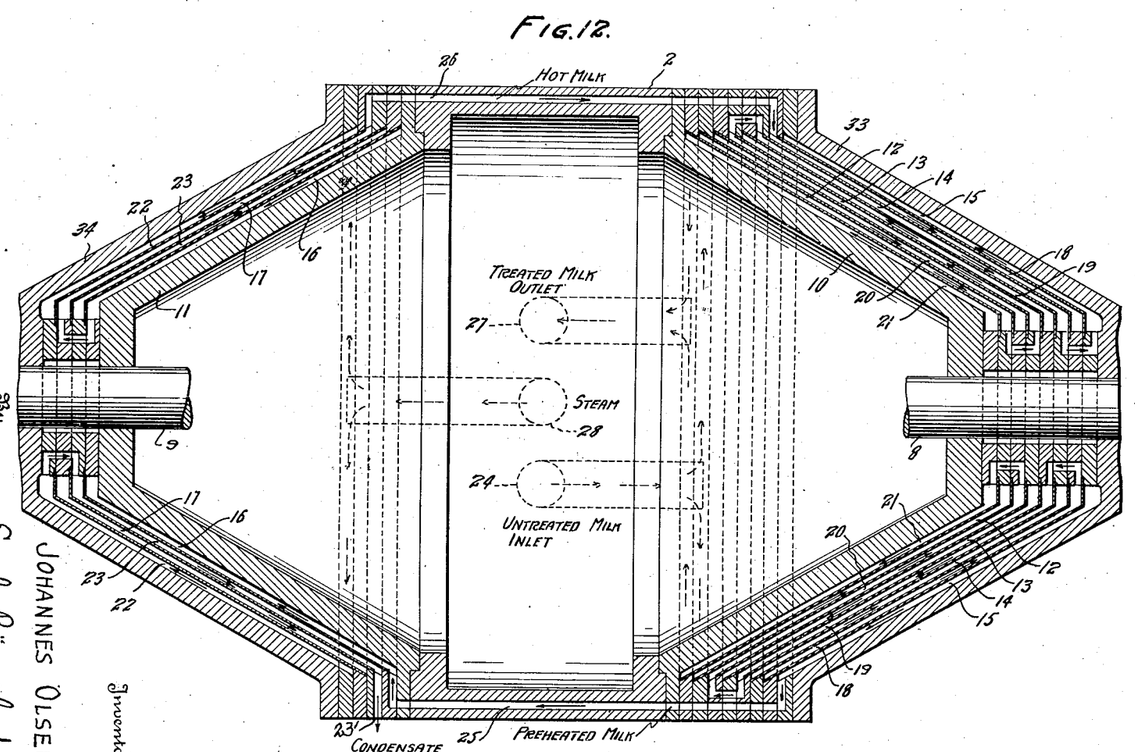
Fig. 12 is a diagrammatic sectional view showing the flow paths of the liquids through the assembled heat exchanger.

In the form of construction shown in Figs. 10 and 11, the rim 2 is provided with a receiver 81 into which the pasteurized liquid is passed immediately after the pasteurization and in which it is retained a certain time under a constant temperature before it is led to the cooling spaces of the apparatus, wherein the liquid is regenerated and refrigerated. On the receiver 81 is placed a valve 82 provided with a rotatable plug 83 for controlling the flow of the liquid to the casing spaces.

I claim as my invention:

1. A regenerative heat exchange apparatus comprising a plurality of nested conical plates, annular flanges fixed to the apex and base portion of each conical plate for spacing the plates apart, the annular flanges having a plurality of ports therein providing passages for conducting fluid to and from the spaces between the nested conical plates and from one space between the nested conical plates to another.

2. A regenerative heat exchange apparatus comprising a plurality of nested conical plates, annular flanges fixed to the apex and base portion of each conical plate for spacing the plates apart, the annular flanges having a plurality of ports therein providing passages for conducting fluid to and from the spaces between the nested conical plates and from one space between the nested conical plates to another, and means extending axially through the apices of the conical plates for securing them together.

3. A regenerative heat exchange apparatus comprising a plurality of nested conical plates, annular flanges fixed to the apex and base portion of each conical plate for spacing the plates apart, the annular flanges having a plurality of ports therein providing passages for conducting fluid to and from the spaces between the nested conical plates and serially from one space between the nested conical plates to another, the thickness of the annular spacing flanges of certain conical plates being less than the thickness of other flanges so that the size of the spaces between the conical plates is varied.

4. A regenerative heat exchange apparatus comprising a fixed header having an annular seat formed on one surface thereof, a plurality of nested conical plates, annular flanges fixed to the apex and base portion of each conical plate for spacing the plates apart, the annular flanges having a plurality of ports therein providing passages for conducting fluid to and from the spaces between the nested conical plates and serially from one space between the nested conical plate to another, the annular flange of one of said plates being positioned on said annular seat, said seat having ports therein adapted to communicate with the ports in the annular flanges of said plates.

5. A regenerative heat exchange apparatus comprising an annular member, a threaded member rotatably mounted axially of said annular member, a gear wheel rotatably mounted axially in said annular member, means for coupling the gear wheel to the threaded member to transfer rotary motion from the gear wheel to the threaded member, a seat formed on an annular member, a plurality of conical heat exchange elements positioned on said seat formed on the annular member, a threaded element extending axially through the apices of the conical heat exchange elements and cooperating with said threaded member for retaining the heat exchange elements in operative association with said annular member, said annular member having a plurality of passages therein communicating with the heat exchange elements.

6. A regenerative heat exchange apparatus comprising a frusto-conical housing having an annular seat surrounding the base of and a similar seat at the apex of the frusto-conical portion of the housing, said seats having ports formed therein, a plurality of nested frusto-conical annular plates mounted on the frusto-conical portion of the housing, each plate having an annular flange secured to the inner and outer edge thereof, said flanges being of a thickness sufficient to space apart the nested plates to provide fluid passages therebetween, said flanges having ducts therein adapted to provide serial communication between the fluid passages and ports in the seats of the housing, said housing having ports for conducting a fluid to be treated to and from the apparatus and treating fluid to and from the apparatus.

7. A regenerative heat exchange apparatus comprising a frusto-conical housing having an annular seat surrounding the base of and a similar seat at the apex of the frusto-conical portion of the housing, said seats having ports formed therein, a plurality of nested frusto-conical annular plates mounted on the frusto-conical portion of the housing, each plate having an annular flange secured to the inner and outer edge thereof, said flanges being of a thickness sufficient to space apart the nested plates to provide fluid passages therebetween, said flanges having ducts therein adapted to provide serial communication between the fluid passages and ports in the seats of the housing, said housing having ports for conducting a fluid to be treated to and from the apparatus and treating fluid to and from the apparatus, and means extending axially through the housing and plates for securing the plates to the housing.

8. A regenerative heat exchange apparatus comprising a frusto-conical housing having an annular seat surrounding the base of and a similar seat at the apex of the frusto-conical portion of the housing, said seats having ports therein, a plurality of nested frusto-conical annular plates mounted on the frusto-conical portion of the housing, each plate having an annular flange secured to the inner and outer edge thereof, said flanges being of a thickness sufficient to space apart the nested plates to provide fluid passages therebetween, said flanges having ducts therein adapted to provide communication between the fluid passages and ports in the seats of the housing, said housing having ports for conducting a fluid to be treated to and from the apparatus and treating fluid to and from the apparatus, a threaded shaft extending axially through the plates and housing, a screw-threaded sleeve axially and rotatably mounted in the housing, the threads on the shaft engaging those in the sleeve, and means for rotating the sleeve to secure the plates to the housing.

9. A regenerative heat exchange apparatus comprising a frusto-conical housing having an annular seat surrounding the base of and a similar seat at the apex of the frusto-conical portion of the housing, said seats having ports therein, a plurality of nested frusto-conical annular plates mounted on the frusto-conical portion of the housing, each plate having an annular flange secured to the inner and outer edge thereof, said flanges being of a thickness sufficient to space apart the nested plates to provide fluid passages therebetween, said flanges having ducts therein adapted to provide communication between the fluid passages and ports in the seats of the housing, said housing having ports for conducting a fluid to be treated to and from the apparatus and treating fluid to and from the apparatus, a threaded shaft extending axially through the plates and housing, a screw-threaded sleeve axially and rotatably mounted in the housing, the threads on the shaft engaging those in the sleeve, means for rotating the sleeve to secure the plates to the housing, and a detachable abutment on the free end of the threaded shaft.

10. A regenerative heat exchange apparatus comprising a frusto-conical housing having an annular seat surrounding the base of and a similar seat at the apex of the frusto-conical portion of the housing, said seats having ports formed therein, a plurality of nested frusto-conical annular plates mounted on the frusto-conical portion of the housing, each plate having an annular flange secured to the inner and outer edge thereof, said flanges being of a thickness sufficient to space apart the nested plates to provide fluid passages therebetween, said flanges having ducts therein adapted to provide communication between the fluid passages and ports in the seats of the housing, said housing having ports for conducting a fluid to be treated to and from the apparatus and treating fluid to and from the apparatus, a threaded shaft extending axially through the plates and housing, a screw-threaded sleeve axially and rotatably mounted in the housing, the threads on the shaft engaging those in the sleeve, means for rotating the sleeve to secure the plates to the housing, a rotatable element in said housing, and means for detachably coupling said rotatable element to said threaded sleeve.

11. A regenerative heat exchange apparatus comprising a double frusto-conical housing having an annular seat surrounding the base of and a similar seat at the apex of each of the frusto-conical portions of the housing, said seats having ports formed therein, a plurality of nested frusto-conical annular plates mounted on each frusto-conical portion of the housing, each plate having an annular flange secured to the inner and outer edge thereof, said flanges being of a thickness sufficient to space apart the nested plates to provide fluid passages therebetween, said flanges having ducts therein adapted to provide communication between the fluid passages and ports in the seats of the housing, said housing having ports for conducting a fluid to be treated to and from the apparatus and treating fluid to and from the apparatus.

12. A regenerative heat exchange apparatus comprising a double frusto-conical housing having an annular seat surrounding the base of and a similar seat at the apex of each of the frusto-conical portions of the housing, said seats having ports formed therein, a plurality of nested frusto-conical annular plates mounted on each frusto-conical portion of the housing, each plate having an annular flange secured to the inner and outer edge thereof, said flanges being of a thickness sufficient to space apart the nested plates to provide fluid passages therebetween, said flanges having ducts therein adapted to provide communication between the fluid passages and ports in the seats of the housing, said housing having ports for conducting a fluid to be treated to and from the apparatus and treating fluid to and from the apparatus, and means extending axially through the housing and plates for securing the plates to the housing.

13. A regenerative heat exchange apparatus comprising a double frusto-conical housing having an annular seat surrounding the base of and a similar seat at the apex of each of the frusto-conical portions of the housing, said seats having ports formed therein, a plurality of nested frusto-conical annular plates mounted on each frusto-conical portion of the housing, each plate having an annular flange secured to the inner and outer edge thereof, said flanges being of a thickness sufficient to space apart the nested plates to provide fluid passages therebetween, said flanges having ducts therein adapted to provide communication between the fluid passages and ports in the seats of the housing, said housing having ports for conducting a fluid to be treated to and from the apparatus and treating fluid to and from the apparatus, a threaded shaft extending axially through each set of plates and into each frusto-conical portion of the housing, a threaded sleeve in each frusto-conical portion of the housing adapted to cooperate with the threaded shafts for securing the sets of plates to the housing, a rotatable element in the housing, and means for selectively coupling the rotatable element to either sleeve.

14. A regenerative heat exchange apparatus comprising a frusto-conical housing having an annular seat surrounding the base of and a similar seat at the apex of the frusto-conical portion of the housing, said seats having ports formed therein, a plurality of nested frusto-conical annular plates mounted on the frusto-conical portion of the housing, each plate having an annular flange secured to the inner and outer edge thereof, said flanges being of a thickness sufficient to space apart the nested plates to provide fluid passages therebetween, said flanges having ducts therein adapted to provide communication between the fluid passages and ports in the seats of the housing, said housing having ports for conducting a fluid to be treated to and from the apparatus and treating fluid to and from the apparatus, a threaded shaft extending through the set of plates for securing them to the housing, said shaft having an axial bore, a second shaft slidably positioned in said bore, means on the second shaft for engaging the outermost plate, and means for preventing relative sliding between said shafts.

JOHANNES OLSEN.